US010019672B2

(12) United States Patent
Allen et al.

(10) Patent No.: US 10,019,672 B2
(45) Date of Patent: *Jul. 10, 2018

(54) GENERATING RESPONSES TO ELECTRONIC COMMUNICATIONS WITH A QUESTION ANSWERING SYSTEM

(71) Applicant: International Business Machines Corporation, Armonk, NY (US)

(72) Inventors: Corville O. Allen, Morrisville, NC (US); James E. Carey, Rochester, MN (US); Jenny S. Li, Danbury, CT (US); John S. Mysak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/469,793

(22) Filed: Aug. 27, 2014

(65) Prior Publication Data

US 2016/0062988 A1 Mar. 3, 2016

(51) Int. Cl.
G06F 17/30 (2006.01)
G06N 5/04 (2006.01)
G06F 17/27 (2006.01)

(52) U.S. Cl.
CPC ............. G06N 5/04 (2013.01); G06F 17/277 (2013.01); G06F 17/30634 (2013.01); G06F 17/30657 (2013.01); G06F 17/30979 (2013.01)

(58) Field of Classification Search
CPC ......... G06F 17/30979; G06F 17/30657; G06F 17/30634
See application file for complete search history.

(56) References Cited

U.S. PATENT DOCUMENTS

| | | | |
|---|---|---|---|
| 6,604,090 B1 | 8/2003 | Tackett et al. | |
| 7,434,262 B2* | 10/2008 | Aaron | H04L 63/0263 709/206 |
| 7,756,878 B2* | 7/2010 | Findley | G06Q 10/107 707/748 |
| 7,774,292 B2* | 8/2010 | Brennan | G06F 17/30979 704/270 |
| 7,962,466 B2* | 6/2011 | Jones | G06F 17/30864 707/706 |
| 8,000,973 B2 | 8/2011 | Williams et al. | |

(Continued)

OTHER PUBLICATIONS

Allen, C. et al, "Generating Responses to Electronic Communications with a Question Answering System," U.S. Appl. No. 14/491,450, filed Sep. 19, 2014.

(Continued)

*Primary Examiner* — Paras D Shah
*Assistant Examiner* — Bryan S Blankenagel
(74) *Attorney, Agent, or Firm* — Heather S. Chatterton

(57) ABSTRACT

Text is received from a first client. The text is associated with an electronic communication tool for communication to a second client. Candidate answers are generated based on the text using a question answering system. The question answering system generates the candidate answers based on a plurality of data sources, including at least one personalized data source and at least one informational data source. At least one of the candidate answers is provided to the second client. Each of the candidate answers provided to the second client is selectable.

5 Claims, 5 Drawing Sheets

(56) References Cited

U.S. PATENT DOCUMENTS

| | | | |
|---|---|---|---|
| 8,321,406 B2* | 11/2012 | Garg | G06F 17/30654 707/717 |
| 8,374,859 B2 | 2/2013 | Huang et al. | |
| 8,589,407 B2 | 11/2013 | Bhatia | |
| 2003/0200190 A1* | 10/2003 | Adar | G06Q 10/10 706/45 |
| 2004/0024752 A1* | 2/2004 | Manber | G06F 17/30675 |
| 2005/0105712 A1* | 5/2005 | Williams | G10L 13/027 379/265.02 |
| 2005/0154723 A1* | 7/2005 | Liang | G06F 17/30109 |
| 2005/0187913 A1* | 8/2005 | Nelken | G06F 17/30864 |
| 2008/0307320 A1* | 12/2008 | Payne | G06F 3/0481 715/751 |
| 2008/0312902 A1* | 12/2008 | Dollinger | G06F 17/289 704/4 |
| 2010/0151827 A1* | 6/2010 | Goyal | H04M 3/42382 455/412.1 |
| 2010/0306223 A1* | 12/2010 | Lee | G06F 17/3053 707/759 |
| 2011/0125734 A1* | 5/2011 | Duboue | G09B 7/00 707/723 |
| 2011/0238409 A1 | 9/2011 | Larcheveque et al. | |
| 2012/0066376 A1* | 3/2012 | Nagura | H04L 41/065 709/224 |
| 2012/0078763 A1* | 3/2012 | Koll | G06Q 30/04 705/34 |
| 2012/0078837 A1* | 3/2012 | Bagchi | A61B 5/00 706/52 |
| 2012/0078888 A1* | 3/2012 | Brown | G06F 17/30654 707/723 |
| 2012/0102405 A1* | 4/2012 | Zuckerman | G06F 19/345 715/733 |
| 2012/0253810 A1 | 10/2012 | Sutton et al. | |
| 2012/0296638 A1* | 11/2012 | Patwa | G06F 17/30654 704/9 |
| 2012/0301864 A1* | 11/2012 | Bagchi | G09B 7/02 434/362 |
| 2012/0303614 A1* | 11/2012 | Mercuri | G06Q 10/101 707/723 |
| 2013/0007037 A1* | 1/2013 | Azzam | G06F 17/30654 707/769 |
| 2013/0110876 A1* | 5/2013 | Meijer | G06F 21/6227 707/783 |
| 2013/0132178 A1* | 5/2013 | Masuko | G06Q 30/0217 705/14.19 |
| 2013/0212190 A1 | 8/2013 | Patil | |
| 2013/0262501 A1* | 10/2013 | Kuchmann-Beauger | G06F 17/30958 707/769 |
| 2013/0275164 A1 | 10/2013 | Gruber et al. | |
| 2013/0325992 A1 | 12/2013 | McGann et al. | |
| 2014/0046889 A1 | 2/2014 | Biem et al. | |
| 2015/0269142 A1 | 9/2015 | Antebi et al. | |

OTHER PUBLICATIONS

Allen, C. et al., "Generating Answers to Text Input in an Electronic Communication Tool with a Question Answering System," U.S. Appl. No. 14/491,477, filed Sep. 19, 2014.

IBM, "List of IBM Patents or Patent Applications Treated as Related.".

Mahadeo, R.,"Artificial Intelligence Chat," A Master's Paper in Computer Science, The Pennsylvania State University, The Graduate School Capital College, Oct. 2004.

Robertson, A., "New IBM Project puts Watson to Work in Customer Service," www.http://www.theverge.com/users/adirobertson, last modified May 21, 2013, accessed Mar. 5, 2014.

Allen, C. et al., "Generating Answers to Text Input in an Electronic Communication Tool With a Question Answering System," Application Number, filed Aug. 27, 2014.

* cited by examiner

GENERATING RESPONSES TO ELECTRONIC COMMUNICATIONS WITH A QUESTION ANSWERING SYSTEM

BACKGROUND

The present disclosure relates to electronic communication, and more specifically, to generating responses to electronic communications using a question answering system.

Electronic communication tools enable real time non-verbal communication between users. Electronic communication tools can come in many forms including instant messaging programs and social network messaging tools (wall posts, tags, mentions, direct messaging, etc.). Typically, users will type a message into a text entry window and perform an action to communicate the message to another user (e.g. clicking a send button). The users receiving the message typically are unable to see the message until the user performs the action to communicate the message.

SUMMARY

According to embodiments of the present disclosure, a method for generating responses to an electronic communication is disclosed. The method includes receiving text from a first client. The text is associated with an electronic communication tool for communication to a second client. The method further includes generating candidate answers based on the text using a question answering system. The question answering system generates the candidate answers based on a plurality of data sources, including at least one personalized data source and at least one informational data source. The method further includes providing at least one of the candidate answers to the second client. Each of the at least one candidate answers is selectable by the second client.

Further disclosed herein are embodiments of a computer program product for generating responses to an electronic communication. The computer program product includes a computer readable storage medium having program code embodied therewith. The program code is executable by a computer to perform a method. The method includes receiving text from a first client. The text is associated with an electronic communication tool for communication to a second client. The method further includes generating candidate answers based on the text using a question answering system. The question answering system generates the candidate answers based on a plurality of data sources, including at least one personalized data source and at least one informational data source. The method further includes providing at least one of the candidate answers to the second client. Each of the at least one candidate answers is selectable by the second client.

Further disclosed herein are embodiments of a system for generating responses to an electronic communication. The system includes one or more processors, one or more computer-readable memories, one or more computer-readable tangible storage devices, and program instructions stored on at least one of the one or more storage devices for execution by at least one of the one or more processors via at least one of the one or more memories. The program instructions include program instructions to receive text from a first client. The text is associated with an electronic communication tool for communication to a second client. The program instructions further include program instructions to generate candidate answers based on the text using a question answering system. The question answering system generates the candidate answers based on a plurality of data sources, including at least one personalized data source and at least one informational data source. The program instructions further include program instructions to provide at least one of the candidate answers to the second client. Each of the at least one candidate answers is selectable by the second client.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
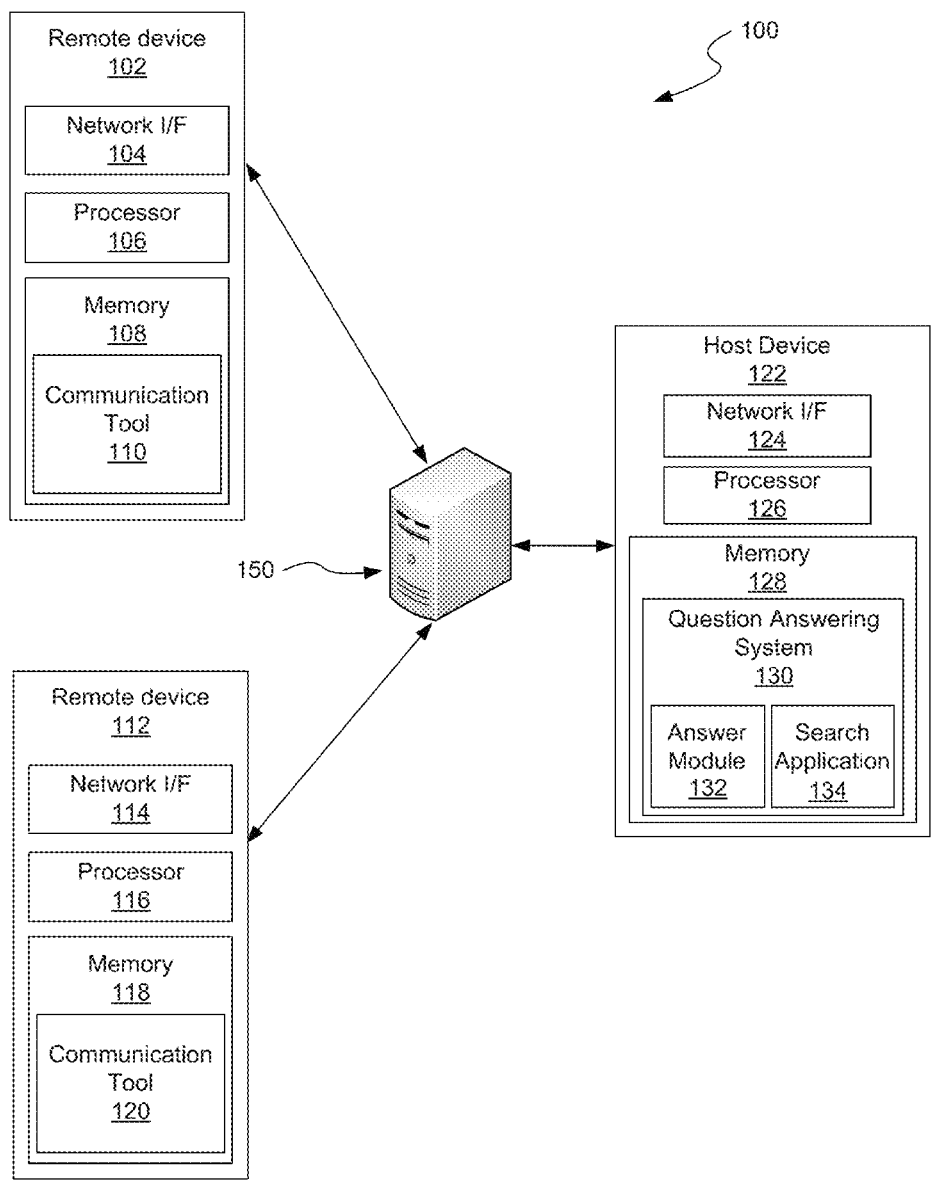
FIG. 1 depicts a diagrammatic illustration of an example computing environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to generating responses to electronic communications using a question answering system, and other aspects relate to generating answers to text input in an electronic communication tool. While the present disclosure is not necessarily limited to such applications, various aspects of the disclosure may be appreciated through a discussion of various examples using this context.

Electronic messaging tools are helpful for enabling real time non-verbal communication between two or more parties. However, one drawback from messaging tools is that they can hinder productivity when it comes to sending and receiving unnecessary messages. Unnecessary messages may include messages which could have been easily answered by a computer.

Embodiments of the present disclosure may provide for generating answers to real time electronic messages in an electronic communication tool. The electronic communication tool may include an instant messaging tool, social network communication tool, or any other electronic communication tool. Text entered by a first user into a text entry window of an electronic communication tool for communication with a second user may be input into a question answering system to generate candidate answers. The candidate answers may be provided to the second user for selection to respond to the first user. The candidate answers may be displayed alongside the text entry window, or displayed in any other area on the second user's computer display. Confidence scores may also be calculated for each answer and provided to the user along with the generated answers.

The generated answers may be selectable by the second user such that the text entry window is populated with a generated answer when it is selected. This may allow the second user to edit the generated answer before communicating it to the first user. In some embodiments, the generated answer may be immediately sent to the first user upon selection by the second user.

The question answering system may analyze the text input using natural language processing techniques and generate queries to apply to multiple data sources to identify possible answers. The data sources may include personalized data for the second user and informational databases. The personalized data may include electronic communication history across one or more electronic communication tools. For example, the personalized data may include history from one or more instant messaging tools and communication history from one or more social networks. Personalized data may also include personal profiles such as a social network profile. Personalized data may further include feedback information collected from a user, such as whether a previous generated answer was good or not. The informational data sources may include textbooks, manuals, FAQs, or any other sources which may be useful in answering questions. The informational data sources may be located locally on the second user's computing device or may be located remotely. The informational data sources may include data sources which are access-restricted which the second user has access to.

Answers generated based on personalized data may be given higher confidence scores than answers based on informational data sources. For example, an answer to a question may be found in an informational data source and in a response to the same question in the chat history for the user receiving the question. The answer determined through chat history may be scored higher as the user has already previously determined that this was the correct answer.

In some embodiments, the text entered into the text entry window may be communicated to the question answering system as the first user is constructing the message and before the first user submits the electronic message. This may allow for answers to be generated prior to the first user submitting the message and allow the answers to be shown as soon as the message is sent by the first user.

For example, first user may type a message into a text entry window of an instant messaging application for communication to a second user which says "Do you know about System A?" Before the first user sends the question to the second user, the question may be input into a question answering system to generate candidate answers such as "Yes, how can I help you?" along with confidence ratings. The question answering system may search electronic communication history for the second user and find that the second user has discussed System A before. The question answering system may also find manuals for System A on the second user's computer which indicate that the second user may know about System A.

As the conversation continues, the questions may become narrower in scope and the question answering machine may be able to give more specific answers. For example, the first user may ask "What does it cost?" The question answering system may take into account the previous questions asked by the first user to determine that the first user wants to know what the price is to buy System A and may search for the price. The question answering system may find product brochures regarding System A which have a price.

In some embodiments, the answers generated by the question answering system may be provided to the first user, the sender of the question, instead of the second user. The first user may enter a question into a text entry window for communication to the second user, and the question may be input into the question answering system to generate candidate answers to provide to the first user. The first user may receive the candidate answers before communicating the question to a second user. This may allow the first user to avoid disturbing the second user by asking a question which can be answered by the question answering system. For example, the first user may type "Do you have an ETA on defect 12345?" The question answering system may have access to a defect repository which says the problem is closed and may tell the first user "Are you sure you want to send this? It appears the problem is closed." This may save the second user the time of looking up the answer and responding to the first user.

In some embodiments, the first user may be blocked, at least temporarily, from communicating the question to the second user. A communication may be blocked if the question answering system generates an answer with a confidence score higher than a specified value. For example, when the first user attempts to communicate the question to the second user the message may be blocked and the first user may be provided with candidate answers and a dialog box which states "Are you sure you want to send this? Here are some candidate answers to your question:" The first user may be allowed to continue with sending the communication or cancel the send. In some embodiments, the first user may not be provided with the candidate answers until they attempt to communicate the question to the second user.

Turning now to the figures, FIG. 1 is a diagrammatic illustration of an example computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network through communication server 150 which comprises a central hub through which remote devices 102, 112 can communicate electronic messages. Alternatively, the communication server and remote devices may be configured in any other suitable relationship (e.g., in a peer-to-peer or other relationship). Host device 122 may be a part of communication server 150 or may be in communication with communication server 150 over a network or other connection.

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via communication server 150 through any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 may submit text communications to communication server 150 for communication to other remote devices. These text communications may be submitted to communication server 150 as they are being constructed on remote devices 102, 112. Communication server 150 may pass the text communications to host device 122 to generate answers. For example, the remote devices 102, 112 may include a communication tool 110, 120 (e.g., in the form of a web browser or any other suitable software module) and present a graphical user (e.g., GUI, etc.) or other interface (e.g., command line prompts, menu screens, etc.) for communication with other remote devices, for submission to communication server 150, and further to display answers obtained from the host devices 122.

Consistent with various embodiments, host device 122 and remote devices 102, 112 may be computer systems equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., receiving an input question, determining a set of answer-types, prompting for clarifying data, determining a set of candidate answers, providing at least one candidate answer), and may be implemented by any combination of any quantity of software and/or hardware modules or units.

Figure 2:
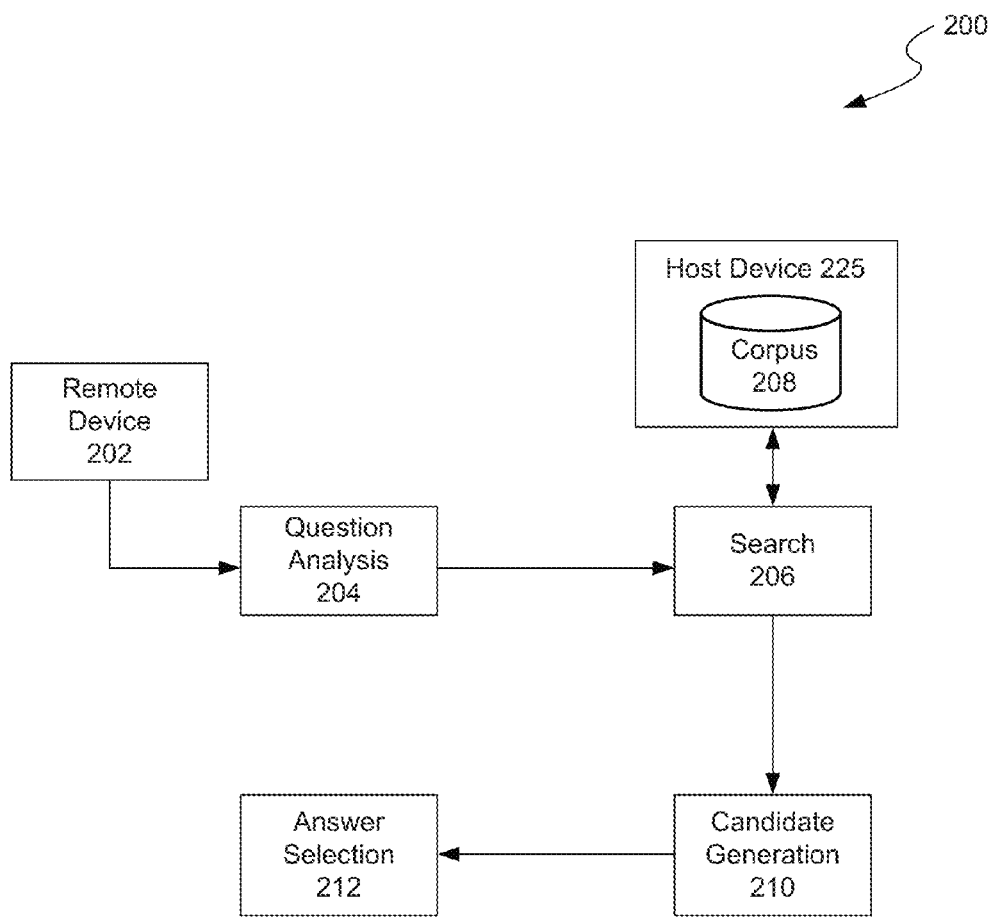
FIG. 2 depicts a system diagram of a high level logical architecture for a question answering system, consistent with embodiments of the present disclosure.

FIG. 2 is a system diagram depicting a high level logical architecture for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web-pages, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212.

The various components of the exemplary high level logical architecture for a QA system described above may be used to implement various aspects of the present disclosure. For example, the question analysis component 204 could, in certain embodiments, be used to analyze an input question. Further, the search component 206 can, in certain embodiments, be used to perform a search of a corpus of information 208. The candidate generation component 210 can be used to identify a set of candidate answers based on clarifying data. Further, the answer selection component 212 can, in certain embodiments, be used to provide at least one candidate answer of the set of candidate answers.

Figure 3:
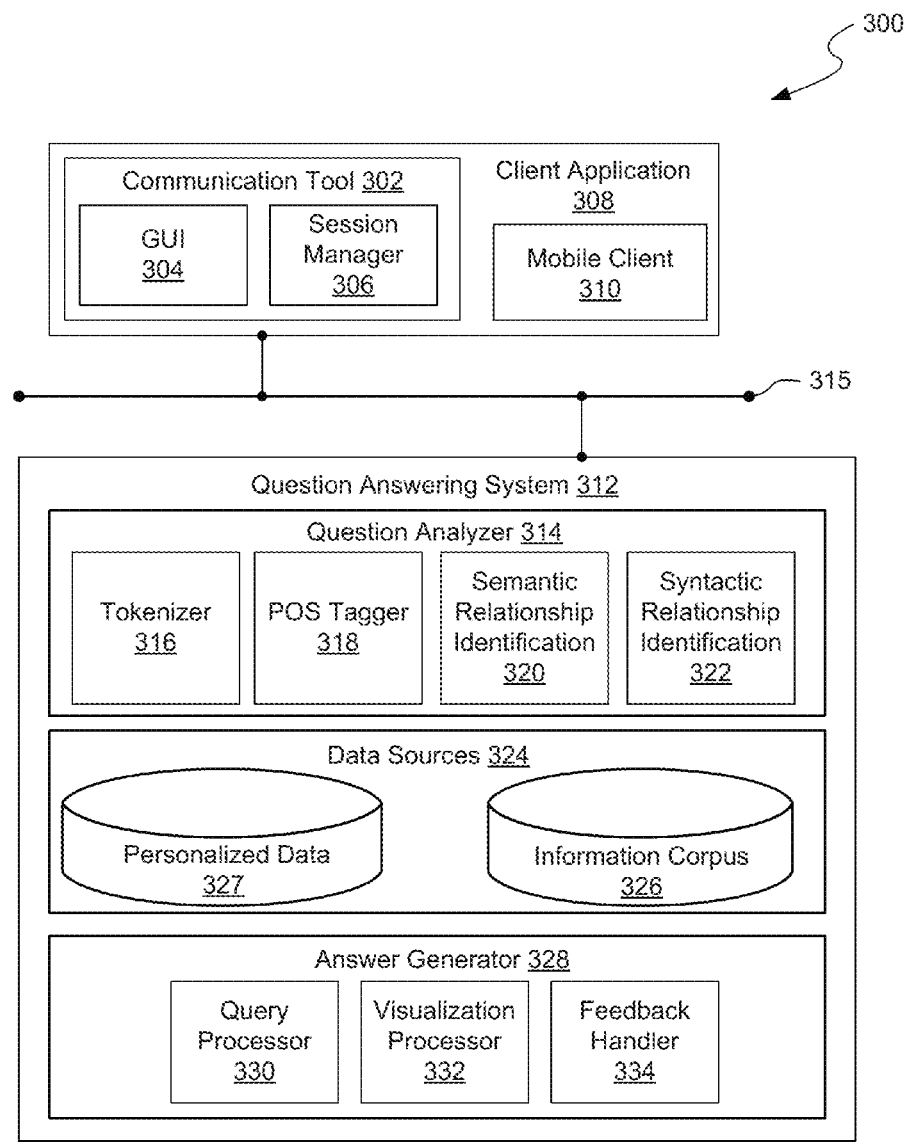
FIG. 3 depicts a block diagram of a question answering system to generate answers to one or more input questions, consistent with various embodiments of the present disclosure.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to input questions. In certain embodiments, one or more users may send questions to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a communication tool 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application, installed on a mobile or other handheld device. In certain embodiments, mobile client 310 may dispatch query requests to QA system 312.

Consistent with various embodiments, communication tool 302 can communicate questions from a first user to a second user and can dispatch requests for information to QA system 312. In certain embodiments, communication tool 302 can be a client application to QA system 312. In certain embodiments, communication tool 302 can send requests for answers to QA system 312. Communication tool 302 may be installed on a personal computer, a server or other computer system. In certain embodiments, communication tool 302 can include a graphical user interface (GUI) 304 and session manager 306. Users may enter questions in GUI 304. In certain embodiments, GUI 304 may include a text entry window or other GUI component, the content of which represents a question to be submitted to another user and to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may encompass include, but are not limited to a tokenizer 316, part-of-speech (POS) tagger 318, semantic relationship identification 320, and syntactic relationship identification 322.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In certain embodiments, POS tagger 316 can tag or otherwise annotates tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized entities in questions posed by users. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 314 may trigger computer modules 316-322. Question analyzer 314 can use functionality provided by computer modules 316-322 individually or in combination. Additionally, in certain embodiments, question analyzer 314 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 may include an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In some embodiments, the information corpus may be a relational database. In some example embodiments, data sources 324 may include one or more document repositories. In certain embodiments, data sources 324 may include personalized data 327. Personalized data 327 may include data about specific users such as electronic message history and user profiles. Answers based on information retrieved from personalized data 327 may be scored more highly than answers based on information from information corpus 326.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive an input question from a user. The question analyzer 314 could, in certain embodiments, be used to analyze the input question to determine characteristic(s) about a set of answer types. Further, the query processor 330 or the answer generator 328 could, in certain embodiments, be used to determine a set of candidate answers.

Figure 4:
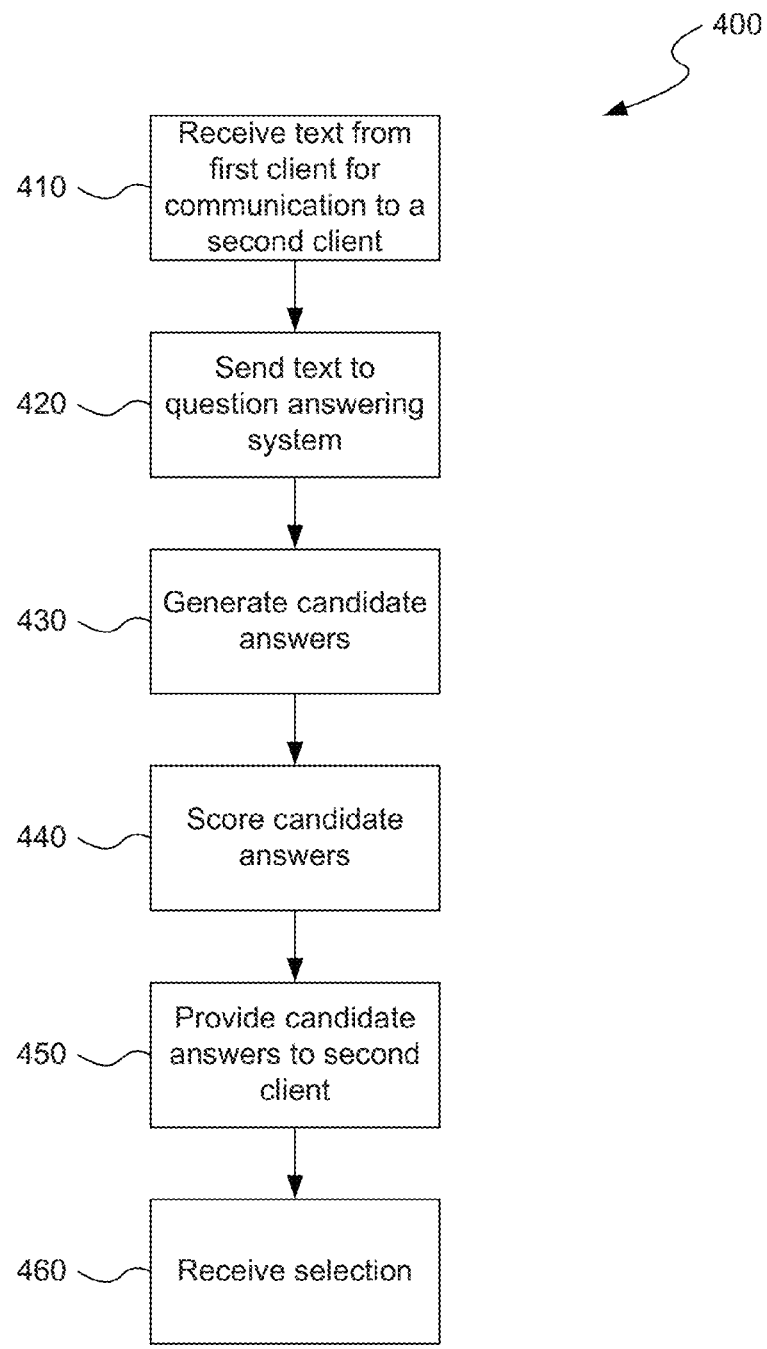
FIG. 4 depicts a flow diagram of an example method for generating responses to electronic communications.

Referring to FIG. 4, a flow diagram of an example method for generating responses to electronic messages is depicted. At block 410, text may be received from a first client which is for communication to a second client. The text may be received by a communication server for transmitting electronic communications between clients. The text may be input into a text entry window of an electronic communication tool such as an instant messaging program or a social network messaging tool. The text may be received prior to the first client communicating the text to the second client.

At block 420, the text is sent to a question answering system. In some embodiments, the text entered into the electronic communication tool may be sent to the question answering system as it is entered into the first client and before it is communicated to the second client. In some embodiments, the text may be sent to the question answering system in response to the first client communicating the text to the second client.

At block 430, candidate answers may be generated by the question answering system. The question answering system may perform natural language processing to the text to extract features from the text. These features may be used to generate queries which may be applied to several data sources, including sources with unstructured information, to generate candidate answers. The data sources may include personalized data sources for a user associated with the second client, such as electronic communication history, and other informational sources. Some of the data sources may be access restricted databases which are accessible by the user associated with the second client.

At block 440, confidence scores may be calculated for the candidate answers. The confidence scores may be calculated using any number of different algorithms. Calculating the confidence scores may include performing searches to obtain evidence for the candidate answers. Candidate answers generated based on personalized data sources may be scored more highly than candidate answers generated based on other informational sources.

At block 450, at least one of the candidate answers may be provided to the second client. The candidate answers may be selectable at the second client. If the candidate answers are generated prior to communication of the text to the second client, providing the candidate answers to the second client may be performed in response to the text being communicated to the second client. The candidate answers provided to the second client may be selected based on their respective confidence scores. For example, the candidate answers with a confidence score above a specified value may be provided to the second client. The confidence scores may also be provided to the second client along with the candidate answers.

At block 460, a candidate answer selection may be received from the second client. In some embodiments, the selected answer may be communicated to the first client in response to the selection. In some embodiments, a text entry window associated with the electronic communication tool is populated with the selected answer. This may allow the second client to edit the answer before communicating the answer to the first client.

In some embodiments, a candidate answer may be communicated to the first client without being selected by the second client. For example, the candidate answer with the highest confidence score may be communicated to the first client if the user associated with the second client is unavailable. For example, the candidate answer with the highest confidence score may be communicated to the first client in response to a specified period of time elapsing after the second client received the communication from the first client. In another example, the candidate answer with the highest confidence score may be communicated to the first client if there are a specified number of active communication windows open in the communication tool of the second client.

Figure 5:
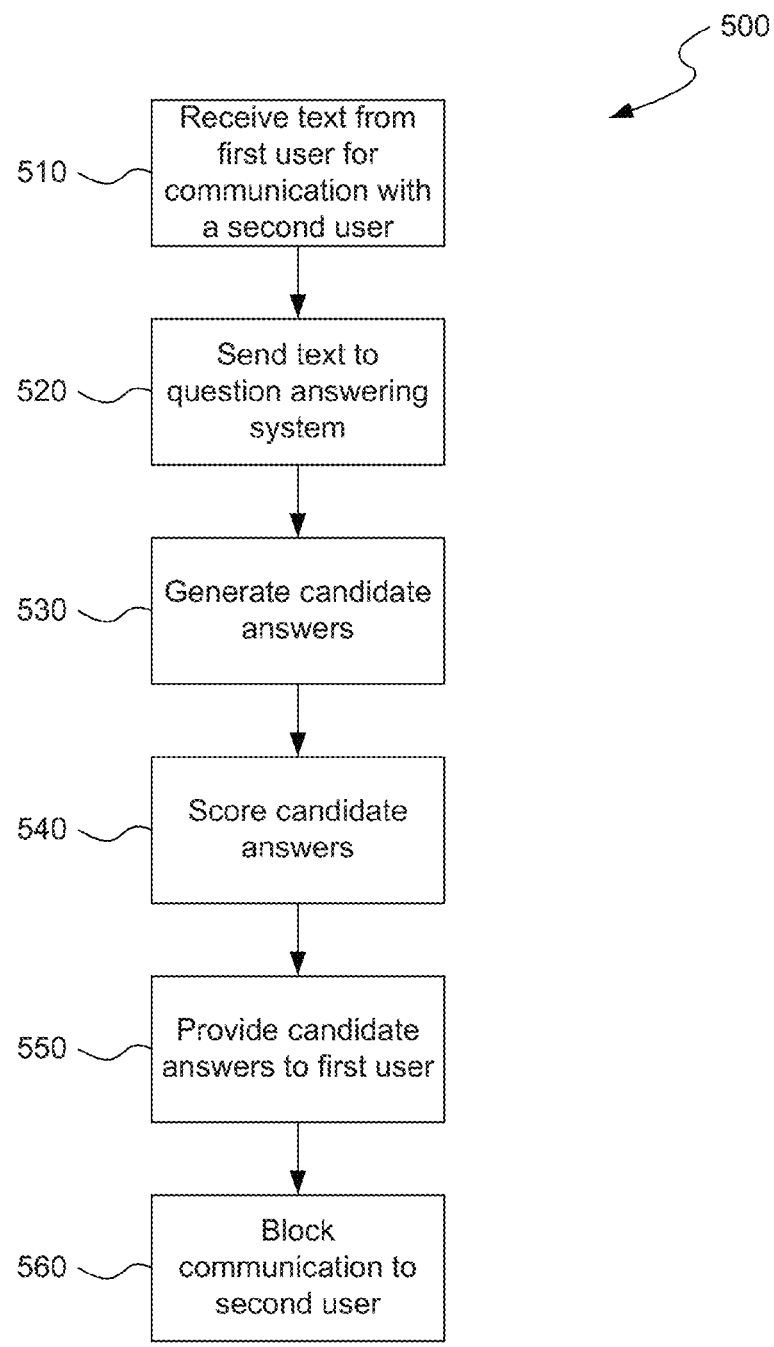
FIG. 5 depicts a flow diagram of an example method for generating answers to questions input into an electronic messaging tool.

Referring to FIG. 5, a flow diagram of an example method for generating answers to questions input into an electronic messaging tool is depicted. At block 510, text may be received from a first user which is for communication to a second user. The text may be input into an electronic communication tool such as an instant messaging program or a social network messaging tool. The text may be input into a text entry window or input using any other method of text entry.

At block 520, the text may be sent to a question answering system. In some embodiments, the text entered into the electronic communication tool may be sent to the question answering system as it is entered by the first user and before it is communicated to the second user. The text may be sent to the question answering system through a communication server associated with the electronic communication tool.

At block 530, candidate answers may be generated by the question answering system. The question answering system may perform natural language processing to the text to extract features from the text. These features may be used to generate queries which may be applied to several data sources, including sources with unstructured information, to generate candidate answers. Some of the data sources may be access restricted databases which are accessible by the first user.

At block 540, confidence scores may be calculated for the candidate answers. The confidence scores may be calculated using any number of different algorithms. Calculating the confidence scores may include performing searches to obtain evidence for the candidate answers.

At block 550, at least one of the candidate answers may be provided to the first user. The candidate answers provided to the first user may be selected based on their respective confidence scores. For example, the generated candidate answers with a confidence score above a specified value may be provided to the first user. The confidence scores may also be provided to the first user along with the candidate answers. In some embodiments, candidate answers may only be provided to the first user if at least one of the confidence scores exceeds a specified value.

At block 560, a communication attempt by the first user may be blocked. The communication attempt may be blocked if there is a candidate answer with a high confidence score. The first user may be provided with text notifying the first user of the candidate answer and asking if they would like to send the communication regardless. For example, the first user may click the send button on the communication tool to send the text to the second user. The first user may be blocked from sending the communication and may be provided with a popup which states "Are you sure you want to send this message? Here is a candidate answer to your question:" along with the candidate answer. The first user may also be provided with a selectable icon which allows the first user to continue with the communication to the second user.

In some embodiments, a blocked communication attempt by the first user may be provided to the second user in a way which does not interrupt the second user. For example, chat history for the second user may be updated to include the text from the first user and the answers provided to the first user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A non-transitory computer program product for generating responses to an electronic communication, the computer program product comprising a computer readable storage medium having program code embodied therewith, the program code executable by a computer to perform a method comprising:
    receiving text from a first client, the text associated with an electronic communication tool for communication to a second client;
    generating candidate answers based on the text and additional text previously received from the first client using a question answering system, the question answering system generating the candidate answers based on a plurality of data sources comprising at least one personalized data source and at least one informational data source, wherein the at least one personalized data source is personalized to the second client and the at least one informational data source is unstructured data, wherein the plurality of data sources comprises an access-restricted data source accessible by the second client, and wherein one or more of the candidate answers contain analytics rendered from the plurality of data sources;
    calculating confidence scores for the candidate answers;
    identifying a highest confidence score from the confidence scores;
    communicating a first candidate answer associated with the highest confidence score to the first client in response to a specified period of time elapsing after communication of the text to the second client;
    providing the first user with text notifying the first user of the first candidate answer;
    inquiring whether the first user would like to send the communication to the second user regardless of the first candidate answer;
    receiving, from the first user, an indication that the first user would like the communication sent to the second user regardless of the first candidate answer;
    providing at least one of the candidate answers to the second client, each of the candidate answer provided with an associated confidence score, each of the at least one candidate answers selectable and editable by the second client, wherein the selection of a second candidate answer is based on input received, by the second client, from a user of the second client;
    displaying the at least one candidate answer to the second client, via a display;
    receiving the second candidate answer from the second client; and
    displaying the second candidate answer to the first client.

2. The computer program product of claim 1, wherein the text is received prior to the first client communicating the text to the second client.

3. The computer program product of claim 1, wherein the calculated confidence scores are higher for candidate answers generated based on the at least one personalized data source.

4. A system for generating responses to an electronic communication, the system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to receive text from a first client, the text associated with an electronic communication tool for communication to a second client;
    program instructions to generate candidate answers based on the text and additional text previously received from the first client using a question answering system, the question answering system generating the candidate answers based on a plurality of data sources comprising at least one personalized data source and at least one informational data source, wherein the at least one personalized data source is personalized to the second client and the at least one informational data source is unstructured data, wherein the plurality of data sources comprises an access-restricted data source accessible by the second client, and wherein one or more of the candidate answers contain analytics rendered from the plurality of data sources;

program instructions to calculate confidence scores for the candidate answers and to identify a highest confidence score from the confidence scores;

program instructions to communicate a first candidate answer associated with the highest confidence score to the first client in response to a specified period of time elapsing after communication of the text to the second client and to provide the first user with text notifying the first user of the first candidate answer;

program instructions to provide the first user with text notifying the first user of the first candidate answer and receive, from the first user, an indication that the first user would like the communication sent to the second user regardless of the first candidate answer;

program instructions to provide at least one of the candidate answers to the second client, each of the candidate answer provided with an associated confidence score, each of the at least one candidate answers selectable and editable by the second client, wherein the selection of a second candidate answer is based on input received, by the second client, from a user of the second client; and program instructions to display the at least one of the candidate answers to the second client, via a display and to receive the second candidate answer from the second client; and program instructions to display the second candidate answer to the first client.

5. The system of claim 4, wherein the text is received prior to the first client communicating the text to the second client.

* * * * *